April 23, 1968    V. F. CARTWRIGHT    3,380,051
RANGE AND ANGLE MEASURING SYSTEM
Filed April 28, 1966    4 Sheets-Sheet 1
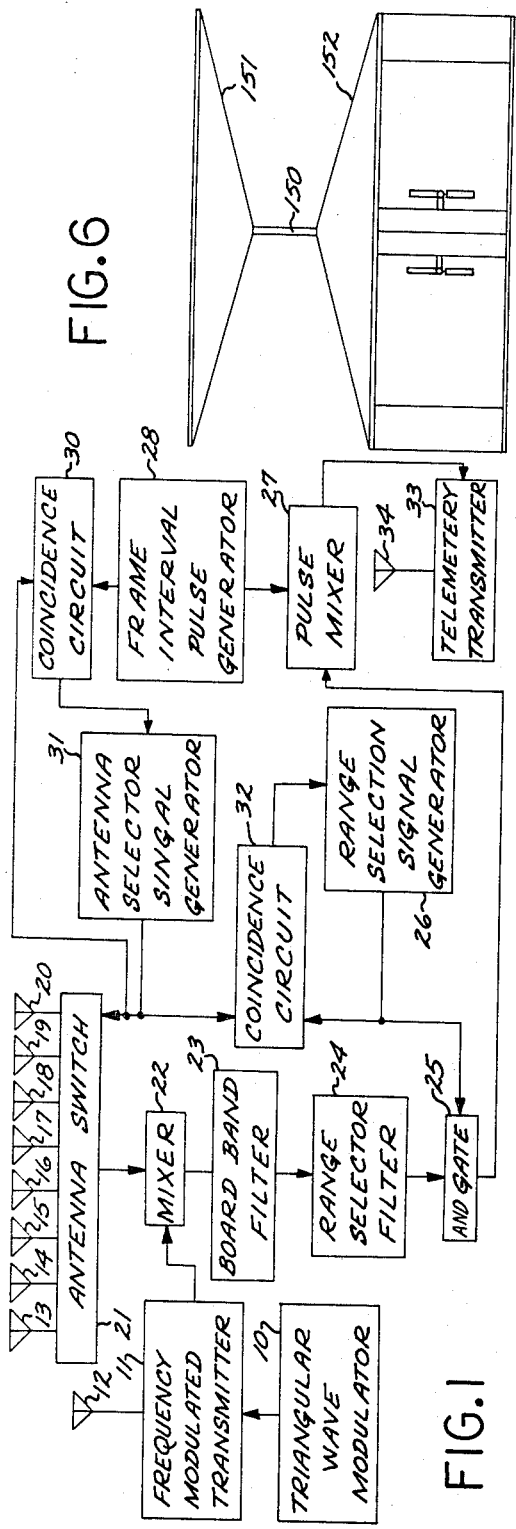
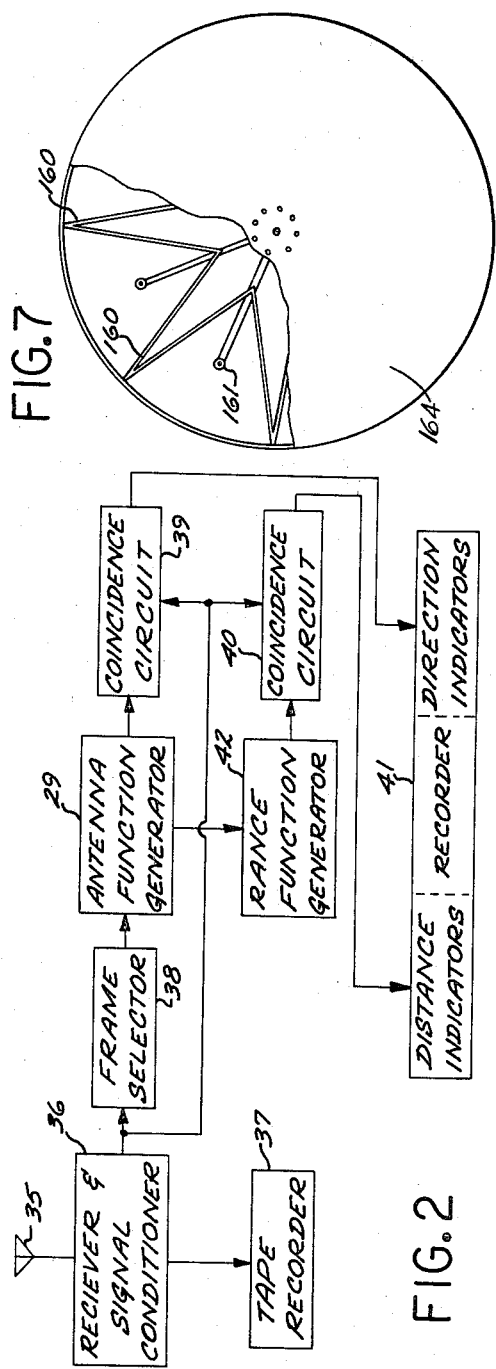
INVENTOR.
VICTOR F. CARTWRIGHT
BY
ATTORNEY

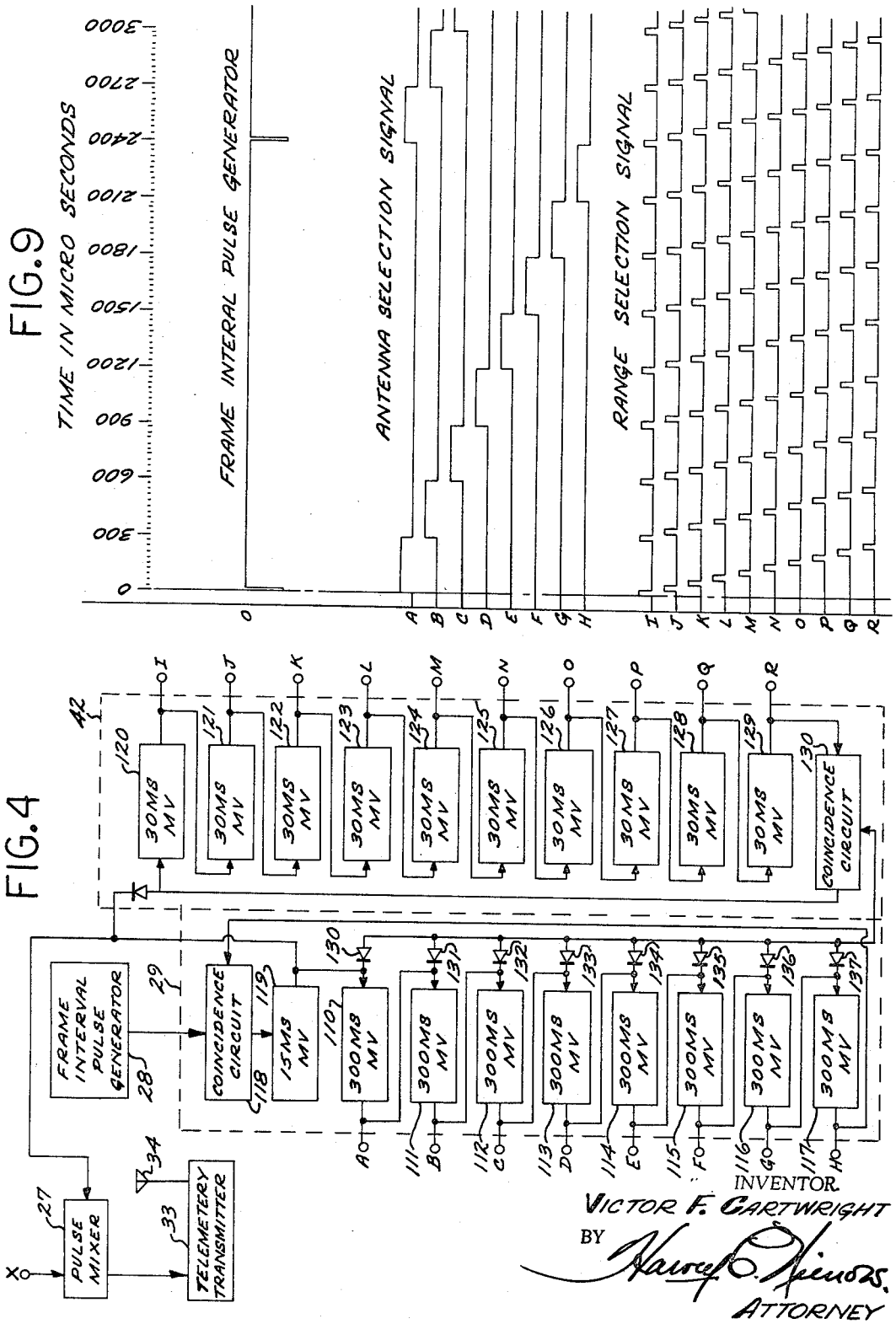

April 23, 1968 V. F. CARTWRIGHT 3,380,051
RANGE AND ANGLE MEASURING SYSTEM
Filed April 28, 1966 4 Sheets-Sheet 4
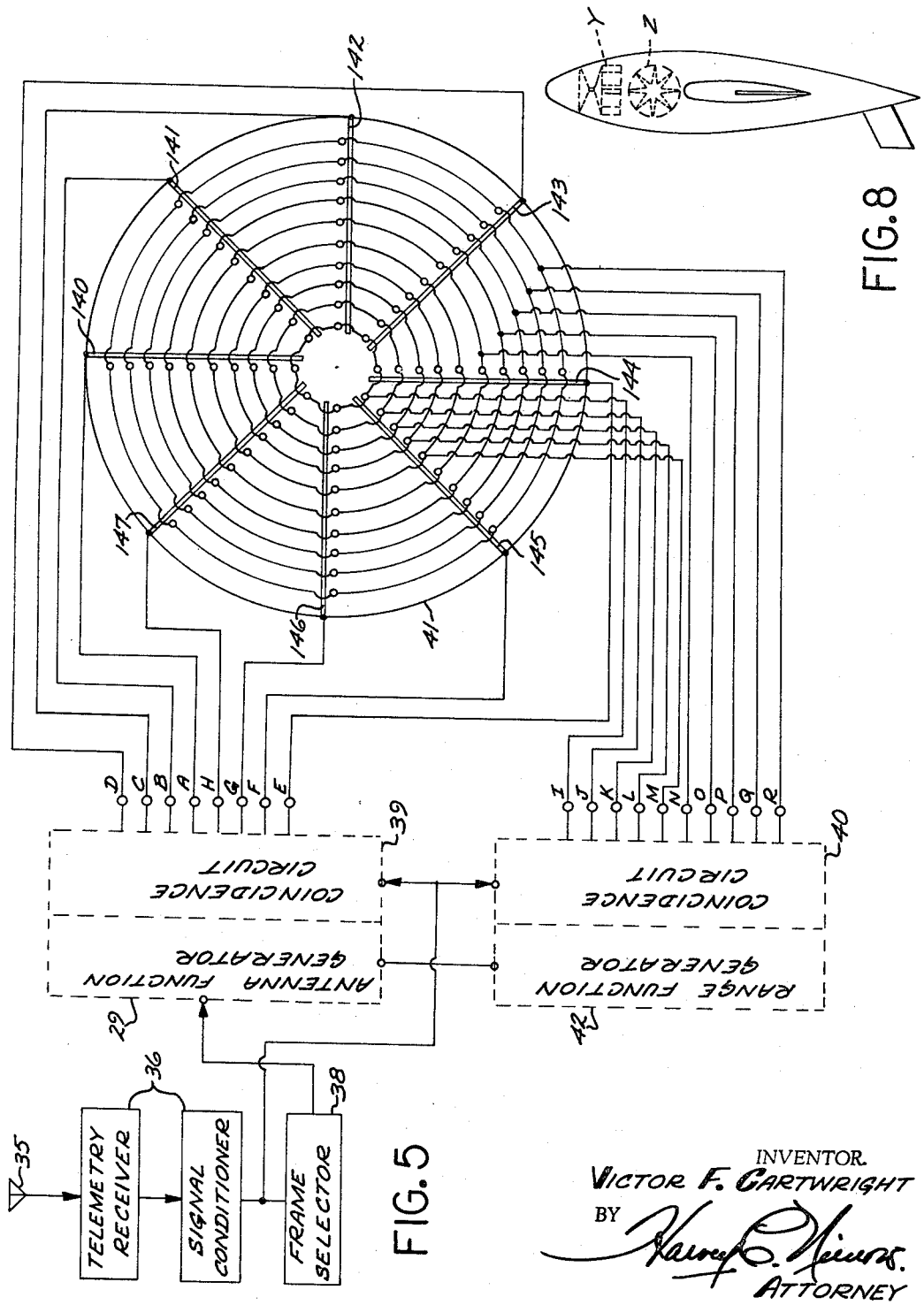
FIG. 8
FIG. 5
INVENTOR.
VICTOR F. CARTWRIGHT
BY
ATTORNEY 3,380,051
RANGE AND ANGLE MEASURING SYSTEM
Victor F. Cartwright, Fullerton, Calif., assignor to Babcock Electronics Corporation, Costa Mesa, Calif., a corporation of California
Filed Apr. 28, 1966, Ser. No. 545,930
14 Claims. (Cl. 343—10)

ABSTRACT OF THE DISCLOSURE

The range and angle measuring system is disclosed in the specification. It includes a frequency modulated transmitter, a receiver of signals from the transmitter both directly and after reflection from an object whose range is to be indicated, and an apparatus for indicating direction and range to the object. The receiver has multiple outputs each effective to pass signals reflected from a difference range. Multiple antennas are provided one for each relative direction from which reflections are to be received. The indicating apparatus provides a separate indication for each antenna and the antennas, receiver outputs and indicators are switched coordinately.

---

This invention relates to systems for measuring the range and angle of a moving missile from a target. It relates particularly to miss-distance indicators.

It is necessary to evaluate the effectiveness of weapons and weapon systems in directing missiles toward a target. When the target is moving through space the task of determining the distance and direction at which missiles pass the target is accomplished with a miss-distance indicator system.

An object of the invention is to provide a superior indicator system for this purpose.

Another object is to provide an indicating system which makes possible the display of miss-distance information in a form not unlike the fixed target practice bull's-eye which permits ready evaluation of projectile angle relative to straight up from the target and which employs concentric rings to indicate miss-distance.

Another object of the invention is to provide an indicator which will measure the distance and direction of a number of small missiles passing the target within a short space of time such, for example, as a burst of small arms bullets, to provide accurate information about their dispersion.

A related object is to provide a passive system in which the distance and direction measuring apparatus is all located on the target from whence it can be recovered and no apparatus need be carried by the missile.

Another object of the invention is to provide an improved wide band frequency modulation miss-indicator system having a high ratio of accuracy and information output to complexity and cost.

These and other objects and advantages of the invention are realized in part by the provision of: a transmitter means for transmitting to a missile a radio signal whose frequency varies substantially linearly with time; and of a receiving antenna comprised of a number of directional antennas oriented so that they form a composite omnidirectional antenna system the individual antennas of which can be sampled in sequence and by which the direction of arriving signals, particularly signals transmitted by said transmitter and reflected from a missile, can be determined; and by the provision of receiver means for combining signals reflected to the antenna means by a missile with signals having the current frequency of the transmitted signals to form a range signal having the frequency of their difference; and by providing means for switching said directional antennas to said receiver means in sequence, and an indicating means for indicating which antenna received a reflected signal or the direction of the missile which reflected it and for indicating the frequency of the range signal or the range it represents.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a block diagram of the airborne station which is carried by the target;

FIGURE 2 is a block diagram of the ground telemetry station which complements the airborne station of FIGURE 1;

FIGURE 4 is a diagram of portions of the airborne station not shown in FIGURE 3 and including the antenna selection signal generator, the range selection signal generator, the frame interval pulse generator, pulse mixer and telemetry transmitter;

FIGURE 5 is a diagram of the ground station;

FIGURE 6 is a view in side elevation of a preferred form of transmitting and receiving antenna for the airborne station;

FIGURE 7 is partly fragmented bottom plan view of the antenna structure of FIGURE 6;

FIGURE 8 is a view in side elevation of a drone aircraft showing in dotted lines alternative orientations of the antenna of FIGURE 6; and FIGURE 9 is a diagram of the wave forms in time sequence generated by the function generators and the frame interval pulse generator.

Like reference characters indicate corresponding parts throughout the several views of the drawings.

Figure 3:
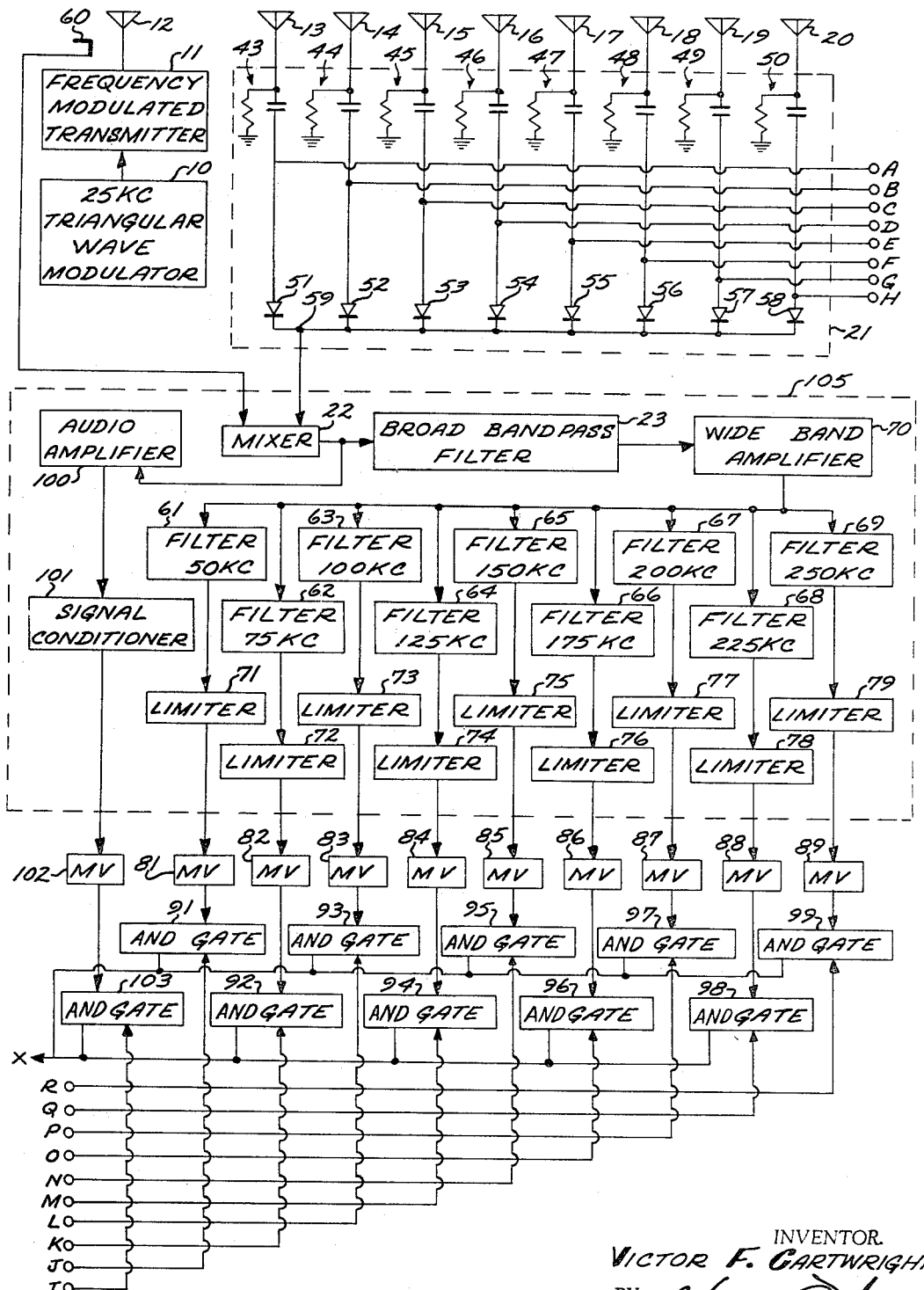
FIGURE 3 is a diagram of portions of the airborne station including the radio signal transmitter, transmitting and receiving antennas, antenna switch, receiver, filters and their associated limiters and multivibrators and OR gates.

If the frequency of a transmitted radio signal is made to vary at a linear rate, then the difference between the frequency of a signal reflected back to the transmitter and the transmitter frequency at the time of its return is a measure of the distance from the transmitter to the point at which the signal was reflected. If a signal of frequency $F_1$ is radiated from the transmitter antenna it will travel outward, intercept a passing missile and be reflected back to the receiving antenna. At the time of its return the transmitter frequency will have changed to $F_2$. The difference between $F_1$ and $F_2$ is proportional to the range from the antennas (the target) to the missile because radio waves travel at uniform velocity and because the transmitter frequency is changed at a substantially linear rate. This relationship is expressed as follows:

$$F_1 - F_2 = \frac{dF}{dt} \times \frac{2R}{C}$$

where the "2" takes into account the fact that the wave, in traveling outward and in being reflected back, traverses twice the range. "C" is the velocity of the radio wave $984 \times 10^6$ feet per second. The equation shows that the output of a radio receiver will be a signal whose frequency is proportional to range (miss-distance) if the inputs to the receiver mixer are the reflected signal and a signal from the transmitter. The scale or the ratio of receiver output cycles per second to the miss-distance in feet is adjusted by changing $dF/dt$. In the embodiment of the invention selected for illustration, this scale factor is approximately 5,000 cycles per second per foot.

The airborne station is shown in FIGURE 1. It comprises a triangular wave modulator 10 which modulates a frequency modulated radio transmitter 11 whose output is radiated by transmitting antenna 12. These elements comprise a preferred form of means for radiating radio signals whose frequency varies at a linear rate. In the embodiment shown the input to antenna 12 is about one watt continuous wave at a center frequency of 4500 megacycles and a maximum frequency deviation of 50 megacycles. The frequency sweep interval is 20 microseconds.

Eight directional receiving antennas designated by numerals 13, 14, 15, 16, 17, 18, 19 and 20, respectively, are connected to an antenna switch 21 which connects one antenna at a time to mixer 22. The mixer also receives an input from the transmitter 11. Its output is applied through a broad band, 50 to 250 kilocycles, filter 23 to a plurality of range selector filters 24. Output of the filters is applied to AND gates 25 and, when the gates are opened by range selection signal generator 26, to a pulse mixer 27. A frame interval pulse generator 28 supplies an output to an antenna selection function generator 29 comprising a coincidence circuit 30 and an antenna selection signal generator 31. Output of the latter is applied to the antenna switch 21 to connect the receiving antenna 13 through 20 in sequence to the mixer 22. Output of the antenna selection signal generator 31 is also connected through a coincidence circuit 32 to the range selection signal generator 26 to initiate opening of the AND gates 25 in sequence. The output of the range selection signal generator 26 to initiate opening of the AND gates 25 in sequence. The output of the range selection signal generator 26 is applied back to coincidence circuit 32 and the output of the antenna selection signal generator is applied back to coincidence circuit 30 whereby the AND gate opening sequence is repeated for each antenna selection and whereby a new frame is initiated when all of the antennas have been switched to mixer 22. The output of the frame interval pulse generator 28 is also applied to the pulse mixer 27 whose output, in turn, is applied to telemetry transmitter 33 and is radiated by antenna 34 to the ground station.

The ground station is shown in FIGURE 2. Telemetry signals impinging an antenna 35 are received by receiver and signal conditioner 36. After detection in the receiver, the telemetry signals are applied to a tape recorder 37, to a frame selector 38, and to a pair of coincidence circuits 39 and 40. The frame selector detects the frame markers and sends an initiating signal to the antenna function generator 29. The function generator output is applied to coincidence circuit 39 which compares function generator 29 output with telemetry signals from the receiver and applies signals when appropriate, to direction indicators in the recorder 41. Signals from the antenna function generator 29 are also applied to range function generator 42 whose output together with telemetry signals from receiver 36, are applied to the coincidence circuit 40. These signals are compared in the coincidence circuit and are applied when appropriate to the distance indicator elements of recorder 41. The antenna function generator 29 of FIGURE 2 is the same as the combination of coincidence circuit 30 and antenna selection signal generator 31 in FIGURE 1. Also the range function generator 42 of FIGURE 2 is equivalent to the combination in FIGURE 1 of coincidence circuit 32 and range selection signal generator 26. These function generators are shown in greater detail in FIGURE 4 and will be explained more fully later.

In FIGURE 3 the disclosure of the frequency modulated transmitter, the antenna switch, the receiver, and the AND gates is expanded. Receiving antennas 13, 14, 15, 16, 17, 18, 19 and 20 are tuned by tuning circuits 43, 44, 45, 46, 47, 48, 49 and 50, respectively, each tuning circuit comprising a resistor connecting the antenna to ground and a coupling capacitor. The antennas are connected through diode rectifiers 51, 52, 53, 54, 55, 56, 57 and 58, respectively, to a common point 59 at one input to mixer 22. The other input to mixer 22 is connected to a capacitive pickup coupling 60 at transmitter antenna 12.

The diode rectifiers 51, 52, 53, 54, 55, 56, 57, 58 are all normally biased so that no signal from any of the receiving antennas can reach the mixer. However, pulses which bias these diodes so that they are rendered conductive are generated in the antenna selection signal generator 31 and are applied to the diodes one at a time in sequence by lines A, B, C, D, E, F, G, and H, respectively. In the embodiment selected for illustration, those pulses have a 300 microsecond duration as illustrated in FIGURE 9. FIGURE 9 shows that at any time one of the diodes is conductive. Signals received by the antenna connected to that diode will be passed to the mixer 22 there to be mixed with a signal derived from the frequency modulated transmitter through coupling 60. The mixer is advantageously of the doubly balanced or ring detector type whereby spurious signals created in the mixing process tend to be balanced out.

The mixer output is an alternating signal whose frequency is the difference between the two input frequencies. Having in mind that the rate of change of the transmitter frequency was 50 megacycles in 20 microseconds, a mixer output frequency of 50 kilocycles represents ten feet of range or miss-distance and 250 kilocycles represents fifty feet of miss-distance. A broad band filter 23 following the mixer 22 is adjusted to pass signals in this frequency range and to reject signals having a frequency below 50 kc. and above 250 kc. The output of the broad band filter 23 is then amplified in a wide band video amplifier 70 before application to the range selector filter 24.

Means are provided in the invention for providing signals indicative of the range of missiles which reflect radio signals to the receiving antenna. In the embodiment selected for illustration in FIGURE 3 that means comprises nine narrow band filters numbered 61, 62, 63, 64, 65, 66, 67, 68 and 69, respectively, each having a 25 kilocycle pass band and having center frequencies of 50 kc., 75 kc., 100 kc., 125 kc., 150 kc., 175 kc., 200 kc., 225 kc. and 250 kc., respectively. The output of the filters is squared up and amplified in limiters designated by numerals 71, 72, 73, 74, 75, 76, 77, 78 and 79 which follow filters 61, 62, 63, 64, 65, 66, 67, 68 and 69 respectively, and whose output is applied to trigger monostable multivibrators 81, 82, 83, 84, 85, 86, 87, 88 and 89, respectively. These multivibrators have their outputs connected to the inputs of AND gates 91, 92, 93, 94, 95, 96, 97, 98 and 99, respectively. The output of all gates are connected in common to line X. Turn-on signals applied to gates 91, 92, 93, 94, 95, 96, 97, 98 and 99, are applied by lines J, K, L, M, N, O, P Q and R respectively.

There is no need to record very near misses of five foot range or less. Reflected signals in this range might be reflections from the drone or target. However, it is convenient to provide an audio amplifier 100 to which mixer 22 output is applied. Low frequency signals are amplified and passed to the signal conditioner 101 where noise is removed before the signal is applied to trigger a monostable multivibrator 102. The multivibrator output is passed through AND gate 103 to line X when gate 103 is turned on by a pulse signal on line I. The mixer 22, broad band pass filter 23, wide band amplifier 70, filters 61 through 69, limiters 71 through 79, audio amplifier 100, and signal conditioner 101 together comprise a preferred embodiment 105 of means for providing output signals whose frequency is indicative of range or miss-distance.

When the AND gates are turned on signals are permitted to pass from the multivibrators via line X to the pulse mixer 27 (FIGURE 4) and thence to telemetry transmitter 33 to be transmitted by antenna 34.

Means are provided in the invention for connecting antennas 13 through 20 to the receiver means 105 in sequence (each for a period of 300 microseconds in this embodiment) and for opening each AND gate in sequence (each for a period of 30 microseconds in this embodiment) so that each AND gate is opened once while each receiving antenna 13 through 20 is connected to the receiver.

Advantageously these means have the form of antenna function generator 29 and range function generator 42. Means are also provided for furnishing cycle start or frame signals which initiate both the antenna switching cycle and the AND gate opening cycle. This means may comprise a frame interval pulse generator such as generator 28, which as shown in FIGURE 9, provides frame markers 2400 microseconds apart.

In FIGURE 4 the antenna function generator 29 includes eight monostable multivibrators connected in series and designated by numerals 110, 111, 112, 113, 114, 115, 116 and 117, respectively. In the absence of output from multivibrator 117, the output of which is connected to coincidence circuit 118, the frame interval pulse generator 28 supplies an initiating signal to the 15 microsecond monostable multivibrator 119 which in turn triggers multivibrator 110. The latter turns on for 300 microseconds and then turns off. During its on period, multivibrator 110 supplies an output signal to line A. The turning off of multivibrator 110 initiates turn on of multivibrator 111. The latter stays on for 300 microseconds, during which time it supplies a signal to line B which renders diode 52 conductive and connects antenna 14 to receiver 105.

At the end of 300 microseconds, multivibrator 111 turns off turning on multivibrator 112 to supply a signal to line C. This process continues as illustrated in FIGURE 9 until multivibrator 117 turns off permitting frame interval pulse generator 28 to reinitiate the cycle. Lines A through H of FIGURE 4 are connected to corresponding lines A through H of FIGURE 3 whereby the antennas 13 through 20 are switched in sequence to receiver 105 in a repeating cycle.

The range function generator 42 comprises ten monostable multivibrators numbered 120, 122, 123, 124, 125, 126, 17, 128 and 129, respectively. They are connected in series, each furnishes a pulse of 30 microseconds duration to its respectively associated line I through R, and each turns on when the preceding multivibrator turns off. The initial turn-on signal is provided by coincidence circuit 130 when the last in line, multivibrator 129, is turned off and when any one of multivibrators 110 through 117 are turned on. The latter condition is sensed through diode rectifiers 130, 131, 132, 133, 134, 135, 136 and 137 which have a common connection to coincidence circuit 130 on one side and are connected to the inputs of multivibrators 110 through 117, respectively, on the other side. Thus, a turn-on pulse is applied by lines I through R to the AND gates associated with those lines respectively, while each antenna is connected to the receiver 105 as shown by FIGURE 9.

Means are provided in the invention for recording information telemetered by telemetry transmitter 33. Advantageously this means has the form selected for illustration in FIGURE 5. Signals received by antenna 35 are applied to the telemetry receiver and signal conditioner 36 where they are converted to pulses corresponding to the pulses applied to the pulse mixer 27 of the airborne station. The output of the signal conditioner is applied to a series of coincidence circuits and to a frame selector 38. The frame selector identifies the frame pulse and sends a signal corresponding to the output signal of the frame interval pulse generator to an antenna function generator 29 and from there to a range function generator 42. These function generators may be, and here are, just like the function generators 29 and 42 of FIGURE 3. However, instead of being initiated by a frame interval pulse generator they are initiated by the frame selector 38 which identifies the frame pulse in the telemetry receiver output. The output lines of the antenna function generator are applied to individual coincidence circuits, shown collectively as coincidence circuits 39 and are permitted to pass to lines A through H if a pulse appears simultaneously on the line from the signal conditioner 36 to the coincidence circuits 39.

Similarly, the output pulses of the range function generator are applied to individual coincidence circuits, shown collectively as coincidence circuits 40, and are allowed to pass to output lines I through R when, and only when, a pulse appears simultaneously on the line from the signal conditioner 36 to the coincidence circuits 40.

Lines A through H are connected to the anvils 140, 141, 142, 143, 144, 145, 146 and 147, respectively, of recorder 41. Lines I through R are connected to successive styli rings of recorder 41 from the innermost to the outermost ring respectively. Each ring comprises the parallel circuit combination of the eight styli (one over each anvil) located equidistant from the center of the recorder. Beginning at the innermost, the rings represent ranges of 5, 10, 20, 25, 30, 35, 40, 45 and 50 feet, respectively.

The recorder is preferably of the type in which a sensitized paper is disposed over the anvils and under the styli. The paper under any stylus is burned when output pulses are applied to that stylus and its anvil.

A preferred form of transmitting and receiving antenna structure is shown in FIGURES 6 and 7. The transmitting antenna 12 comprises a half wave conductor 150 connected at its upper end to a metal cone 151 and at its lower end to the center conductor of a coaxial cable. The lower metal cone 152 is connected to the shield of the coaxial cable. The conical surfaces of the two cones form an angle between them of about 40 degrees. The receiving antenna is comprised of a number (here eight) of individual directional receiving antennas each having a half wave dipole radiator 161 mounted in a sixty degree corner reflector 160. The antennas are arranged side by side in a plane about a central axis, as shown, to form a generally circular assembly underlying metal cone 152. The dipoles are mounted parallel to the corners of their respective reflectors which is parallel to the center axis of the assembly. Advantageously the whole assembly is held fixed together by a rigid foam type potting compound 164 shown fragmented in FIGURE 7 and not shown in FIGURE 6.

Preferred orientation of the antenna structure within a target drone is shown in FIGURE 8, where the drone is shown in side elevation flying up. For end-on or head-on firing practice dashed line orinetation Y is preferred. For beam-on firing the orientation Z is preferred.

Operation of the system is described as follows, it being understood that the apparatus shown in FIGURE 1, including an antenna structure equivalent to that shown in FIGURES 6 and 7, is mounted on a target such as a drone aircraft. The frequency modulated transmitter 11 sends out a continuous wave via omnidirectional antenna 12 which has a frequency deviation of 50 megacycles at a linear rate every 20 microseconds. A burst of gun fire sends a group of missiles past the target. As they pass they reflect radio signals back to those receiving antennas on the target which are oriented toward the passing missiles. The eight receiving antennas are connected to a receiver 105 through normally open diode switches which are closed one at a time for 300 microseconds until after 2400 microseconds each antenna has been connected to the receiver 105. A missile traveling at a speed of 1000 feet per second past the target will move only 2.4 feet in 2400 microseconds so it will be approximately broadside the antenna to which it reflects the transmitter signal when that antenna is connected to the receiver.

In the receiver, the reflected signal is mixed with a signal taken from the transmitter 11 to produce a range signal having the frequency of their difference. This signal, and any other range signal resulting from other reflections, is applied to a number of 25 kilocycle band width filters having center frequencies 25 kilocycles apart. Each range signal having a frequency less than 250 kilocycles will appear in the output of one or two of the filters having a center frequency closest to the range signal frequency. Signals passing through a filter are made to trigger a monostable multivibrator the output pulse of which is applied to an OR gate connected only to that filter. A function generator opens each OR gate in turn once while each antenna is connected to the receiver. Each new cycle of antenna switching is initiated by a frame signal and antennas are connected and OR gates are opened in the same sequence and at the same time in each frame. Thus the range signal, now converted to multivibrator pulse, will pass through the OR gate to pulse mixer 27 and be transmitted by telemetry transmitter 33 at a time relative to the frame signal which identifies the antenna that received the reflection from which it derived. It also identifies the range filter through which it passed thereby identifying its direction and distance from the target.

When the ground receiving station receives the frame pulse it initiates an antenna function generator and a range function generator on the target. The function generators of the ground station apply their pulses to coincidence circuits 39 and 40 which permit the function generator output pulses to pass to recorder 41 only if at the time a pulse is applied there is also applied a pulse from the telemetry transmitter on the target. The ground station antenna function generator applies pulses in turn to coincidence circuits which correspond respectively to receiving antennas 13 through 20 and are connected to recorder anvils 140 through 147. If, for example, a pulse is applied to the coincidence circuit connected to anvil 140 by the antenna function generator 29 of the ground station and simultaneously a pulse is applied to that coincidence circuit by the ground receiver, then that pulse will be applied to anvil 140. Suppose further, that the pulse from the ground receiver resulted because at that instant a reflection from a missile 20 feet away was received at antenna 13. That reflection would result in a 100 kc. arrange signal which would pass through filter 63 and initiate a pulse in multivibrator 83 which would, by FIGURE 9, pass through OR gate 93 on line L at 120 to 150 microseconds after the frame signal. It will be transmitted to the ground station and appear at the coincidence circuit connected to line L. At this same time the range function generator 42 of the ground station will apply a pulse to the coincidence circuit. Because of the coincidence, the pulse will appear on all styli connected to line L. The line L stylus and anvil 170 being energized together, the recorder paper will be burned under that stylus indicating that a missile passed antenna 13 at a distance of twenty feet.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A system for measuring the range and angle of a moving missile from a target comprising:
  (a) an omidirectional transmitting antenna, and a receiving antenna comprising a plurality of individual directional antennas oriented relative to one another to form a composite which when sequentially switched is omidirectional, said transmitting and receiving antennas being arranged to be carried by a target;
  (b) a radio transmitter connected to said transmitting antenna, and means for modulating the frequency of the transmitter linearly over a predetermined range of frequencies;
  (c) a radio receiver system comprising, a mixer whose output frequency varies as the difference between the frequencies of two input signals, and a plurality of output filters each adjusted to pass a selected segment of a band of mixer output frequencies, means for applying to said mixer an input signal having the current frequency of said radio transmitter, and means for applying to said mixer an input signal derived from a selected one of said individual receiving antennas comprising a plurality of diodes each connecting a respectively associated one of said individual directional antennas to said mixer when rendered conductive;
  (d) a telemetery transmitter including a pulse mixer for modulating the frequency of transmitted signals; and
  (e) means for applying to said telemetry transmitter frequency modulating pulses indicative of the range and direction of missiles which reflect signals emitted by said transmitting antenna to said receiving antenna comprising:
    (I) means for rendering said plurality of diodes conductive one at a time in sequence whereby to effectively connect said individual directive antennas to said receiver one after another including a frame interval pulse generator, a first plurality of monostable multivibrators each connected to furnish a turn-on signal of predetermined duration to one of said diodes and its succeeding monostable multivibrator, and means including a coincidence circuit responsive to the output signal of the last of said monostable multivibrators and said frame interval pulse generator to furnish a turn-on signal to the first of said first plurality of monostable multivibrators;
    (II) a plurality of and gates, and a second plurality of monostable multivibrators each connected for activation by a respectively associated one of said output filters to furnish a pulse to said pulse mixer through a respectively associated one of said and gates when rendered open;
    (III) means for rendering said and gates open in sequence whereby to connect said second plurality of monostable multivibrators to said pulse mixer sequentially during the interval in which each individual directive antenna is connected to said receiver including a third plurality of monostable multivibrators each connected to furnish a gate opening pulse of selected duration to a respectively associated one of said and gates and a turn-on signal to its succeeding monostable multivibrator, and means including a coincidence circuit responsive to the output signal of the last of said third plurality of monostable multivibrators and the output signal of each one of said first plurality of multivibrators to furnish a turn-on signal to the first one of said third plurality of monostable multivibrators; and
    (IV) means for connecting the output of said first mentioned coincidence circuit to said pulse mixer.

2. The invention defined in claim 1 further comprising a telemetery receiver including a readout device incorporating a set of indicators corresponding respectively to the filters of said receiver and a number of such sets corresponding respectively to said individual directive antennas, and means for causing said indicators to indicate receipt by said telemetry receiver of pulses corresponding to pulses passed by said and gates, respectively.

3. In a system for measuring range and angle from a target to a moving missile: transmitter means for transmitting frequency modulated radio signals to a missile; receiving antenna means comprising a plurality of antennas each sensitive to a relatively different direction for receiving said radio signals after reflection from a missile; a radio receiver sensitive to the frequency of said reflected signals received by said receiving antenna means which provides output signals whose frequency is indicative of the range of said missile; switching means for switching said plurality of antennas to said receiver sequentially; and a display comprising a set of multiple signal-responsive elements for each antenna arranged about a given point to correspond to the directional sensitivity thereof, each of said elements of each set being arranged relative to said given point in accordance with the range to be represented thereby; and means sensitive to the frequency of said output signals for applying a signal to that individual element which represents the range to which the frequency of said output signal corresponds and which is part of that set of elements which corresponds to the antenna from which said output signal was derived.

4. The invention defined in claim 3 in which said receiving antenna means comprises a succession of corner reflectors arranged side-by-side in a plane about a central axis parallel with their corners, and a plurality of half wave dipole antennas disposed one in each reflector on its midplane and parallel with said center line.

5. The invention defined in claim 4 in which said transmitter means includes a biconical, omnidirectional antenna comprising two metal cones whose bases lie in parallel planes and separated by a half wave active element connecting their apexes and lying on said central axis.

6. The invention defined in claim 3 in which said receiver comprises: a mixer capable of mixing a radio signal having the frequency of the signal emitted by said transmitter means with signals from said receiving antenna means to provide an output signal having the frequency of their difference; and a broad bandpass filter adjusted to pass signals having frequencies above and below selected frequencies; and in which said means sensitive to the frequency of said output signal comprises a plurality of output circuits, and a plurality of narrow pass band filters connected between said broad pass band filter and respectively associated ones of said output circuits and each adjusted to pass signals having a frequency within a respectively assigned segment of said broad pass band.

7. The invention defined in claim 3 in which said switching means comprises a plurality of normally non-conducting diodes each connected between said receiver means and an associated one of said antennas, and means for rendering said diodes conductive one after another.

8. In combination: a function generator including means for initiating a first succession of pulses and means responsive to initiation of each pulse in said first succession to initiate a second succession of pulses; and output circuit; a plurality of means for receiving input signals of frequency within a range of frequencies; a receiver means responsive to such signals to provide receiver output signals having frequency, within a selected range of frequencies, variable with the frequency of said input signals; means for generating an output pulse indicative of the frequency of said receiver signals comprising a plurality of pulse generators each responsive to a different segment of receiver output signal frequencies within said selected range to provide a pulse; means responsive to said first succession of pulses for connecting said plurality of means for receiving input signals one at a time in succession to said receiver means; and means responsive to said second succession of pulses for connecting said pulse generators one at a time in succession to said output circuit.

9. The invention defined in claim 8 in which said means responsive to said second succession of pulses comprises a plurality of AND gates, one connected between each pulse generator and said output circuit.

10. The invention defined in claim 8 in which said signal receiving means comprises a mixer whose output frequency varies as the difference between the frequencies of two signals applied to the mixer inputs, one mixer input adapted for sequential connection by said means responsive to said first succession of pulses to said plurality of means for intercepting signals, and another mixer input adapted for accepting signals independently of action of said means responsive to said first succession of pulses.

11. The invention defined in claim 8 in which said function generator includes means for initiating a frame pulse at predetermined intervals, means responsive to initiation of said frame pulse to initiate said first succession of pulses, and means responsive to initiation of each pulse of said first succession of pulses to initiate said second succession of pulses.

12. The invention defined in claim 11 and further comprising a pulse mixer having one input connected to said output circuit and another input connected to said means for initiating a frame pulse, and a telemetry transmitter connected for modulation by said pulse mixer.

13. The invention defined in claim 8 in which said means responsive to said first succession of pulses comprises a plurality of diodes, one connected between each of said means for receiving input signals and said receiver means, normally biased to a non-conductive state.

14. The invention defined in claim 8 in which said means for generating an output pulse comprises a plurality of filters each adjusted to pass a different segment of receiver means output signal frequencies within said selected range followed by a monostable multivibrator.

References Cited

UNITED STATES PATENTS

| 2,175,252 | 10/1939 | Carter | 343—773 |
| 2,459,461 | 1/1949 | Shankweiler et al. | 343—14 |
| 2,866,967 | 12/1958 | Bernbaum | 343—16 X |
| 3,011,167 | 11/1961 | Alford | 343—799 X |
| 3,070,794 | 12/1962 | Brandon et al. | 343—14 |
| 3,087,151 | 4/1963 | Vantine | 343—13 X |

RODNEY D. BENNETT, *Primary Examiner.*

C. L. WHITHAM, *Assistant Examiner.*